(12) United States Patent
Song

(10) Patent No.: US 10,035,287 B2
(45) Date of Patent: Jul. 31, 2018

(54) METHOD FOR SEALING A FASTENER

(71) Applicant: The Boeing Company, Chicago, IL (US)

(72) Inventor: Weidong Song, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 14/543,253

(22) Filed: Nov. 17, 2014

(65) Prior Publication Data

US 2016/0136859 A1 May 19, 2016

(51) Int. Cl.

| B29C 45/14 | (2006.01) |
| B29C 45/03 | (2006.01) |
| F16B 37/14 | (2006.01) |
| F16B 39/02 | (2006.01) |
| B05C 17/005 | (2006.01) |
| B29K 21/00 | (2006.01) |
| B29L 31/30 | (2006.01) |
| B29C 33/40 | (2006.01) |
| B29C 33/60 | (2006.01) |
| B64D 45/02 | (2006.01) |
| F16B 33/00 | (2006.01) |

(52) U.S. Cl.
CPC .. B29C 45/14819 (2013.01); B05C 17/00516 (2013.01); B29C 45/03 (2013.01); B29C 45/14336 (2013.01); F16B 37/14 (2013.01); F16B 39/021 (2013.01); B29C 33/40 (2013.01); B29C 33/60 (2013.01); B29C 45/036 (2013.01); B29C 45/14467 (2013.01); B29C 45/14639 (2013.01); B29K 2021/00 (2013.01); B29K 2021/003 (2013.01); B29K 2021/006 (2013.01); B29K 2827/18 (2013.01); B29K 2905/08 (2013.01); B29L 2031/3076 (2013.01); B64D 45/02 (2013.01); F16B 33/004 (2013.01)

(58) Field of Classification Search
None
See application file for complete search history.

(56) References Cited

U.S. PATENT DOCUMENTS

| 2,396,005 A * | 3/1946 | Gross ............... F16B 43/001 220/693 |
| 2,710,113 A * | 6/1955 | Pritchard ............ B64D 37/06 156/280 |
| 3,306,964 A * | 2/1967 | Miller, Jr. ......... B29C 45/7613 200/186 |
| 3,907,442 A * | 9/1975 | Reid ..................... B64C 3/34 220/681 |
| 4,971,745 A * | 11/1990 | Ferenc ............ B29C 45/14336 264/263 |

(Continued)

FOREIGN PATENT DOCUMENTS

| EP | 181483 A1 | 5/1986 |
| EP | 2865509 A2 | 4/2015 |

(Continued)

Primary Examiner — Edmund Lee
(74) Attorney, Agent, or Firm — Felix L. Fischer

(57) ABSTRACT

A method for sealing a fastener employs a mold which provided with an inlet port for molding material. The mold is then positioned over a fastener and the mold is sealed against a structure. A molding material is then injected into the mold. The mold is then removed to leave an in-situ molded cap formed over the fastener and sealed to the structure.

11 Claims, 5 Drawing Sheets

(56) References Cited

U.S. PATENT DOCUMENTS

| | | | | |
|---|---|---|---|---|
| 5,322,381 | A * | 6/1994 | Argo, II | B65D 47/06 222/566 |
| 6,372,833 | B1 * | 4/2002 | Chen | C08K 3/22 524/409 |
| 6,429,249 | B1 * | 8/2002 | Chen | C08L 27/12 524/432 |
| 8,562,888 | B2 * | 10/2013 | Kelley | B05C 11/1002 249/98 |
| 9,016,973 | B2 * | 4/2015 | Apfel | F16B 5/02 29/458 |
| 2006/0199917 | A1 * | 9/2006 | Chino | C08F 8/30 525/374 |
| 2009/0202294 | A1 * | 8/2009 | Apfel | F16B 5/02 403/267 |
| 2011/0024943 | A1 * | 2/2011 | Kelley | B05C 11/1002 264/263 |
| 2014/0234050 | A1 * | 8/2014 | Asahara | B64D 45/02 411/371.1 |

FOREIGN PATENT DOCUMENTS

| | | | |
|---|---|---|---|
| FR | 2626629 A1 | | 8/1989 |
| JP | H0724408 A | | 4/1995 |
| KR | 20030094672 | * | 12/2003 |
| WO | WO2013/065311 | * | 5/2013 |

* cited by examiner

METHOD FOR SEALING A FASTENER

BACKGROUND INFORMATION

Field

Embodiments of the disclosure relate generally to corrosion and Electromagnetic effects (EME) protection for mechanical fasteners and more particularly to cap seals molded directly onto fastener heads using in-situ injection molding of thermoplastic elastomer (TPE) compounds in a tip mold.

Background

Construction of aircraft and other mechanical systems require numerous fasteners for structural assembly. In many cases the exposed portion of the installed fasteners must be protected from corrosion, to seal the fuel barrier or provided with supplemental electromagnetic effects (EME) protection. In current composite aircraft structures, individual protection caps are molded and then installed over a locking collar or similar exposed element with a sealing adhesive. This process is time consuming, cost intensive and requires multiple inspection points.

It is therefore desirable to provide a method for corrosion and EME protection of installed fasteners in-situ.

SUMMARY

Exemplary embodiments provide a method for sealing a fastener wherein a mold is provided having an inlet port for molding material. The mold is then positioned over a fastener and the mold is sealed against a structure. A molding material is then injected into the mold. The mold is then removed to leave an in-situ formed molded cap over the fastener and sealed to the structure.

A system for employing the method of in-situ injection molding of a fastener cap incorporates a mold having a cavity sized to be received over a fastener in a structure. An inlet port is in communication with the cavity to receive a molding material. A circumferential sealing surface on the mold is sized to provide a sealing circumference on a surface of the structure surrounding the fastener. An injection system provides molding material through the inlet port.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
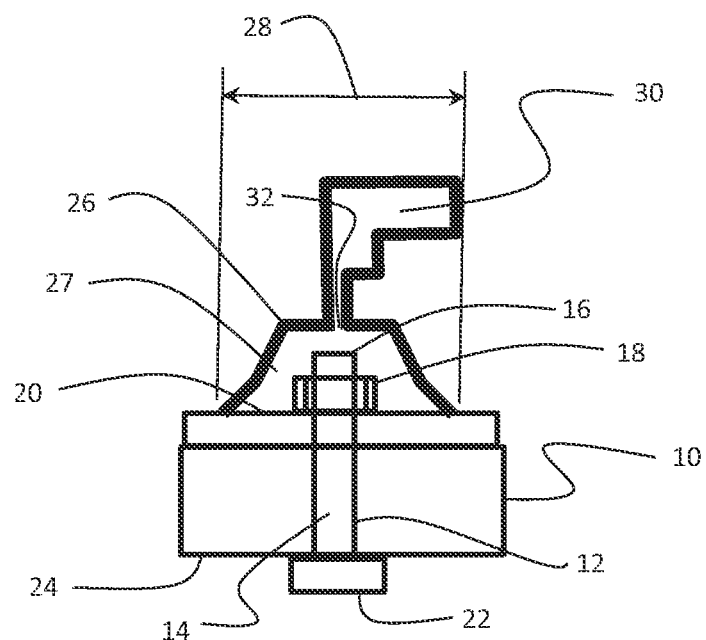
FIG. 1 is a section view representation of a mold and injection system for installing an in-situ molded sealing cap over an installed fastener in a composite multilayer structure.

The embodiments and methods described herein provide a corrosion and EME protective sealing cap for fasteners which is created directly on the exposed fastener elements as installed in the structure (defined herein as "in-situ") with a mold applied over the exposed fastener and sealed to a surface surrounding the fastener. An injection system is employed to fill the mold with a molding material to create the sealing cap. Referring to the drawings, FIG. 1 shows a layer composite structure 10 having a bore 12 through which a fastener 14 is installed. For the particular embodiment shown, the fastener has a fastening end 16 with a collar 18 engaging a surface 20 of the structure 10 and a head 22 engaging an opposing surface 24. A mold 26 has a cavity 27 sized to be received over the fastening end 16 and collar 18 and provide a sealing circumference, represented by diameter 28, on the surface 20 surrounding the collar. An injection system 30, which may be handheld gun such as a hot melt gun, handheld screw driven injection system or similar device for handheld operation in an exemplary embodiment, is attached to an inlet port 32 in the mold for injection of the molding material in a plastic state into the mold 26.

Figure 2:
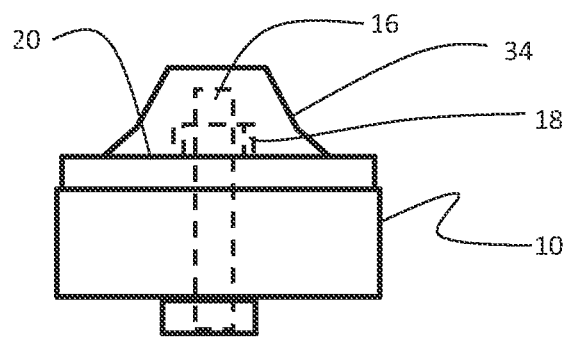
FIG. 2 is a hidden line representation of the molded sealing cap as complete.

Injection of a molding material such as TPE into the mold 26 followed by removal of the mold from the surface 20 leaves an in-situ molded cap 34 as seen in FIG. 2. The cap 34 is sealed to the surface 20 in within the sealing circumference and provides corrosion and EME protection for the fastening end 16 and collar 18.

Exemplary embodiments of the molded sealing cap 26 employ TPE materials such as Hytrel® a thermoplastic polyether-ester block copolymer, available from DuPont, DAI-EL™ thermoplastic T-530, a thermoplastic fluoroelastomer, available from Daikin, and HIPEX®, available from Kraiburg. Comparable formulations demonstrating good resistance to jet fuel and other hydraulic fluids with good low temperature performance (low glass transition point), low melting point and good adhesion to primers may be employed. In alternative embodiments, Polyarylsulphones (PSU), polyphenylsulfones (PPSU) or thermoset elastomers such as Butyl Ethylene Propylene (EPDM), Flouro-carbon (FKM), Neoprene (CR), Nitrile Butadiene (NBR), Silicone (VMQ), Styrene Butadiene (SBR), Urethane, or curing agent activated fluoroelastomers such as DAI-EL G558 available from Daikin Industries LTD. may be employed. Thermoset elastomers take a longer time to cure at high temperature, and additional time and facilities/tools may be required for applying the materials in-situ.

TPE materials are particularly applicable for EME protection since sparks resulting from an EME event will most likely provide a temporary melt in the TPE which will self-seal and be self-healing by re-solidifying.

Treatment of the surface 20 to enhance the sealing of the molded cap 34 to the surface may be accomplished using a primer or adhesive applied over the surface within the sealing circumference 28. An exemplary embodiment for metallic or thermoplastic surfaces employs resin solutions in methyl ethyl ketone (MEK), toluene or poly methyl acrylate (PMA), or combinations thereof such as Thixon 406 available from the Dow Chemical Company as the surface treatment.

Figure 3A:
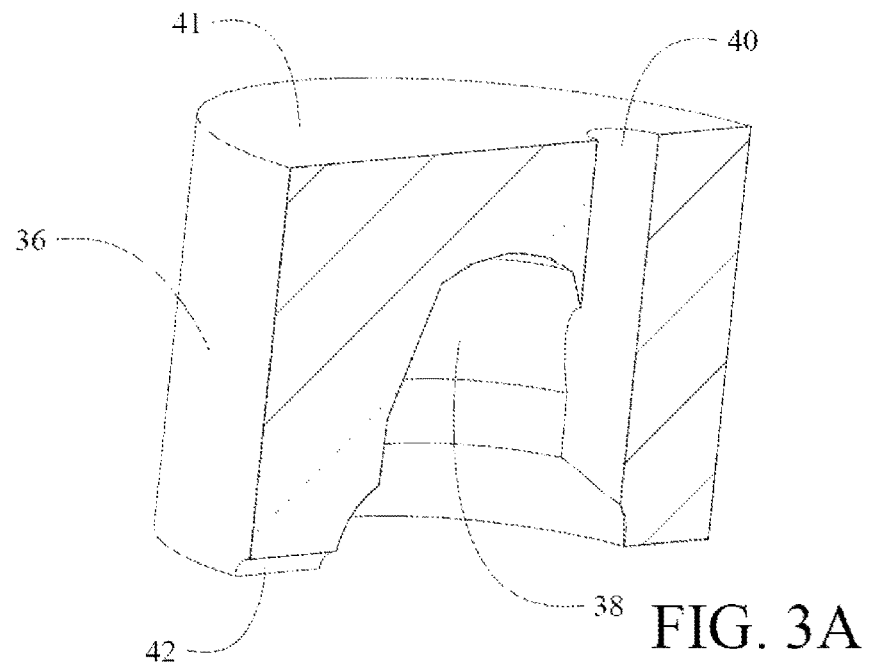
FIG. 3A is a section upper isometric view of a mold to be employed in an exemplary embodiment.
Figure 3B:
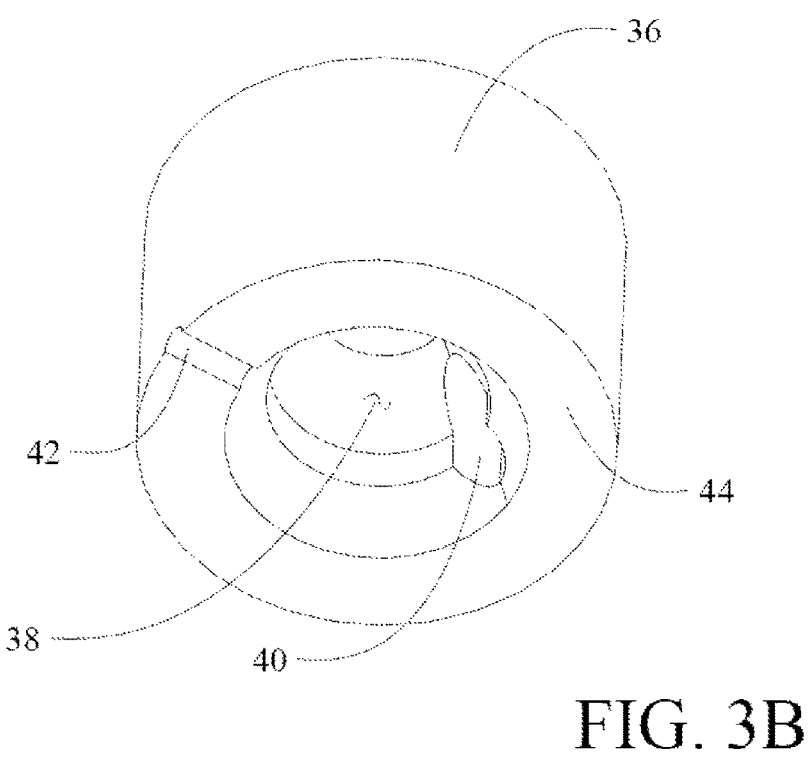
FIG. 3B is a lower isometric view of the mold of FIG. 3A.

In various embodiments, the mold 26 may be machined or itself molded from Polytetrafluoroethylene (PTFE) such as Teflon® available from DuPont or similar non-stick materials, or metals such as stainless steel. An exemplary embodiment of the mold 26 is shown in detail in FIGS. 3A and 3B. A simple cylinder 36 incorporates an inner cavity 38 as the sealing cap mold. An injection port 40 communicating with the inner cavity 38 is provided on an upper surface 41 of the cylinder for attachment to the injection system 30 (as shown in FIG. 1). An overflow port 42 is provided to allow complete filing of the mold. Overflow port 42 is shown as an aperture in the lower sealing circumference 44 of the cylinder. Overflow the molding material creates a tang or sprue which does not bind the mold or prevent removal and is easily cut from the cap 26 after curing. Use of PTFE or similar materials for the mold provides a "non-stick" surface for the mold cavity to allow enhanced disengagement of the mold from the sealing cap upon completion of the injection process. For stainless steel or other metallic molds, a release agent, sprayed into the cavity prior to engagement of the mold on the surface 20, may be employed such as Frekote® 700-NC™ available from Henkel Adhesives International. Details of the mold such as the bell shape of cavity 38 are provided to improve the transition between the vertical wall and the surface 20. The molded cap 34 should have a gradual transition to the flat surface 20 as depicted generically in FIGS. 1 and 2 for adherence of the cap to the surface for better bonding quality.

In various embodiments, the mold 26 and injection system 30 may be manually positioned over fasteners for molding of sealing caps or an automated system employing a robotic element for positioning the mold over the fasteners may be employed. Use of a robotic system may enhance adherence of the sealing cap to the surface by allowing high pressures to be applied to the mold to maintain a seal during molding material injection and preliminary cure. For fasteners placed in structures in close set arrays, the mold may employ multiple cavities to cover multiple fasteners for injection of sealing caps in a single step.

Figure 4:
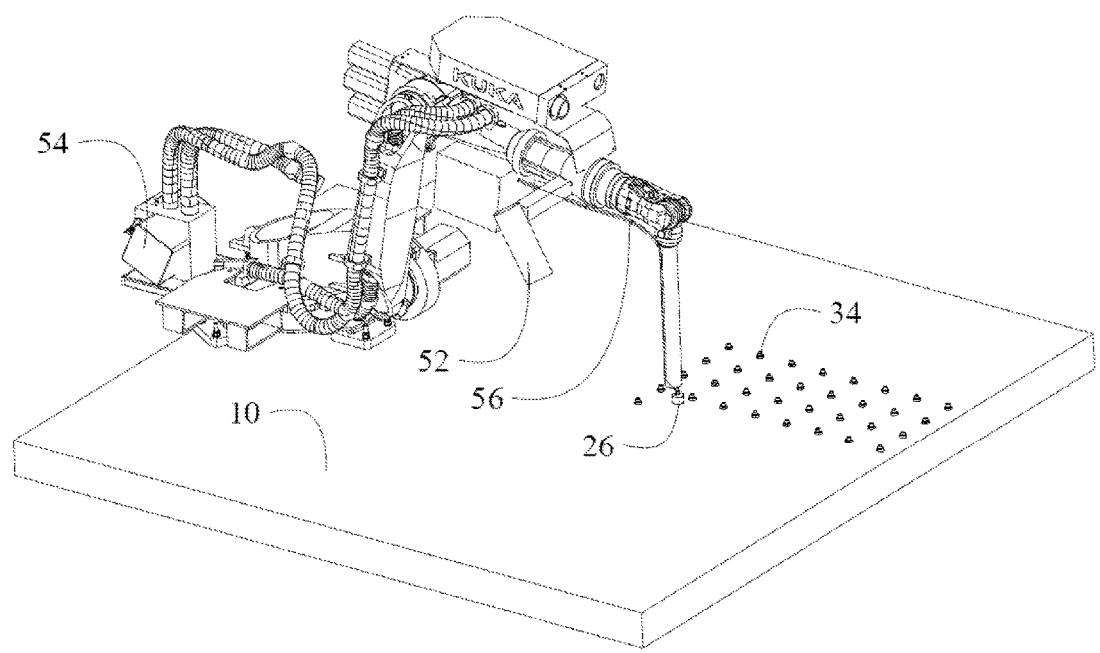
FIG. 4 is a schematic diagram of a robotic system providing positioning of the mold.

A representation of a robotic implementation of the molding system is shown in FIG. 4. A robot 50 is employed for positioning the mold 26 over the fasteners 14 on the structure 10. A vision system 52 and controller 54 are employed in an exemplary embodiment to automatically position the mold 26 and seal the mold against the structure 10 for injection of molding material through an injection system 56.

Figure 5:
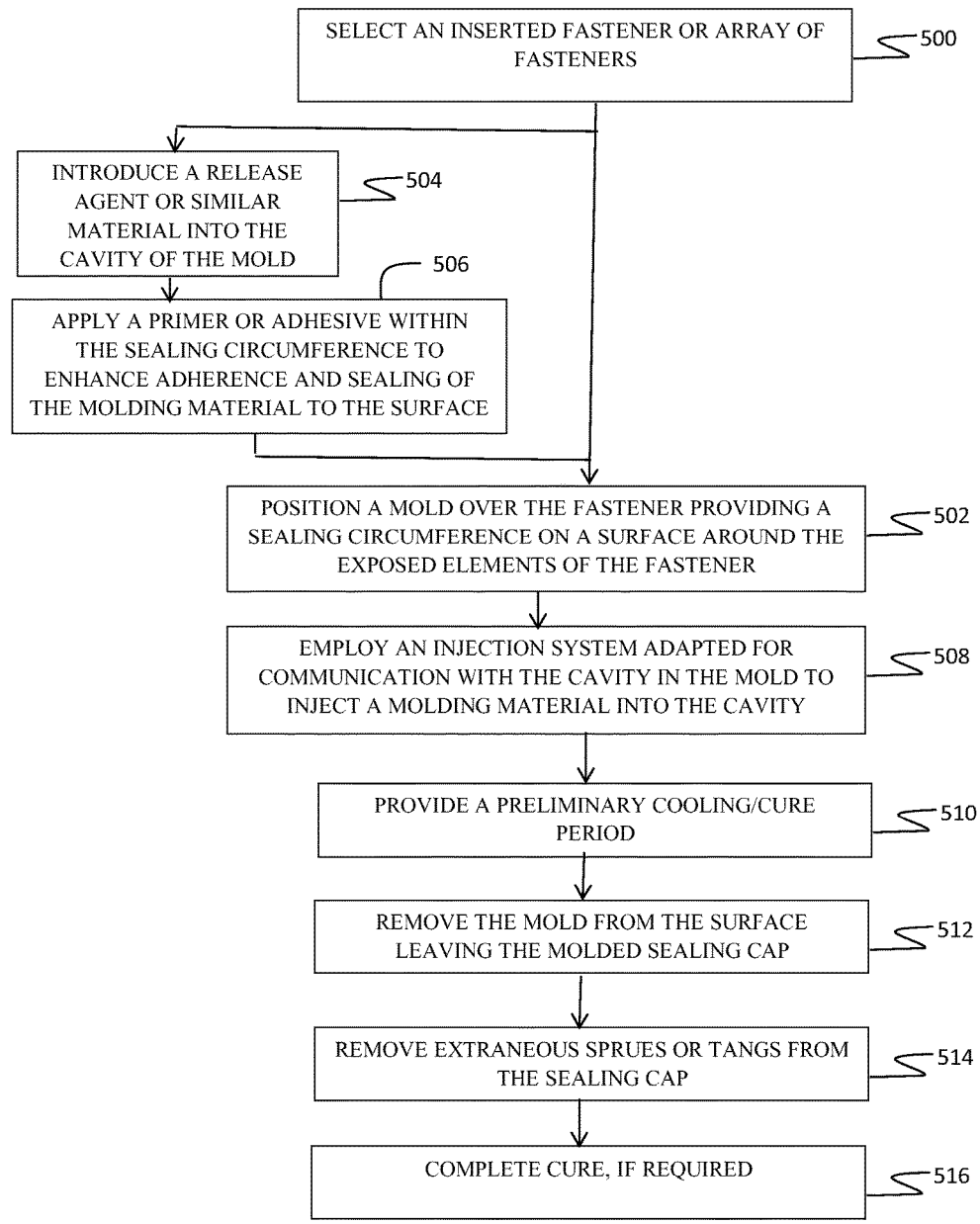
FIG. 5 is a flow chart of a method for implementing the disclosed embodiments.

As shown in FIG. 5, the embodiments disclosed herein provide a method for in-situ molding of a sealing cap on structural fasteners. An inserted fastener or array of fasteners is selected, step 500. A mold is positioned over the fastener providing a sealing circumference on a surface around the exposed elements of the fastener, step 502. A release agent or similar material may be introduced into the cavity of the mold, if required, step 504. Additionally, a primer or adhesive may be applied within the sealing circumference prior to positioning of the mold to enhance adherence and sealing of the molding material to the surface, step 506. In certain embodiments positioning of the mold may be accomplished manually and in other embodiments a robotic system may be employed to automate the mold manipulation. An injection system adapted for communication with the cavity in the mold is employed to inject a molding material into the cavity, step 508. In exemplary embodiments, the molding material is a TPE such as thermoplastic polyether-ester block copolymer, thermoplastic fluoroelastomer, Polyarylsulphones (PSU), polyphenylsulfones (PPSU) or thermoset elastomers. After injection of the molding material, a preliminary cure period (for TPE, a simple cooling period, which may be quite short, since no chemical reaction is involved, as opposed to thermoset materials in which an actual cure for chemical cross linking is required), is provided, step 510, and the mold is then removed from the surface leaving the molded scaling cap, step 512. Extraneous sprues or tangs are removed from the sealing cap, step 514, leaving the completed cap. A complete cure may then occur, if required, step 516.

Figure 6:
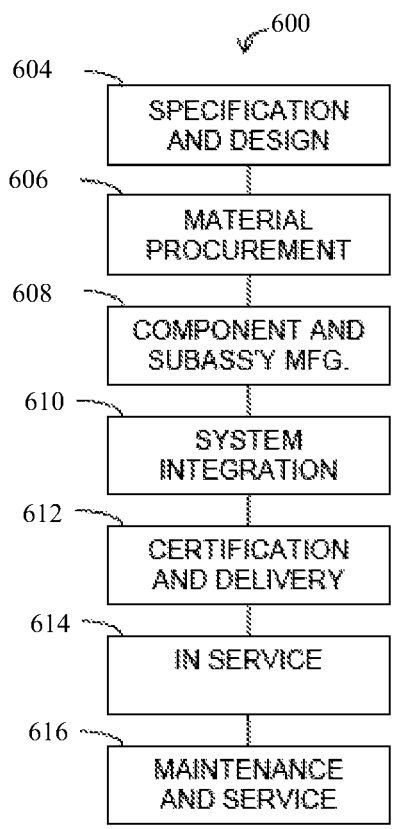
FIG. 6 is a flow diagram of aircraft production and service methodology in which the present embodiments may be employed; and, FIG. 7 is a block diagram of an aircraft employing the embodiments.
Figure 7:
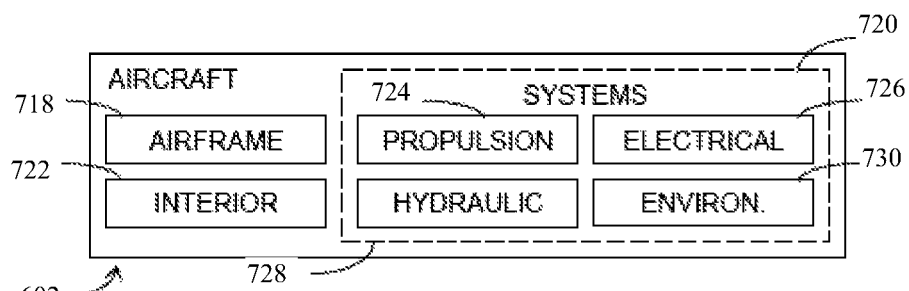

Examples of the disclosure herein for in-situ molding of fastener sealing caps may be described in the context of an aircraft manufacturing and service method 600 as shown in FIG. 6 and an aircraft 602 as shown in FIG. 7. During pre-production, exemplary method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 602 produced by exemplary method 600 may include an airframe 718 with a plurality of systems 720 and an interior 722. Examples of high-level systems 720 include one or more of a propulsion system 724, an electrical system 726, a hydraulic system 726, and an environmental system 730. Any number of other systems may be included.

Apparatus and methods embodied for in-situ molding of fastener caps herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more aspects of the apparatus, method, or a combination thereof may be utilized during the production stages 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for sealing a fastener comprising the steps of:
   providing a mold having an inlet port for molding material;
   positioning the mold over a fastener;
   sealing the mold against a structure;
   injecting a thermoplastic elastomer (TPE) molding material in a plastic state into the mold to fill the mold with any overflow routed through an overflow port, said TPE selected from a set of thermoplastic polyether-ester block copolymers, thermoplastic fluoroelastomers, Polyarylsulphones (PSU) or polyphenylsulfones (PPSU);

cooling the TPE yielding a preliminary cure without chemical reaction; and, removing the mold to leave an in-situ formed molded cap over the fastener and sealed to the structure.

2. The method as defined in claim 1 wherein the molding material adheres to the fastener and the structure.

3. The method as defined in claim 1 wherein the mold provides a sealing circumference on a surface of the structure around the fastener, said molded cap sealed to the surface within the sealing circumference.

4. The method as defined in claim 1 wherein the mold is formed from Polytetrafluoroethylene (PTFE).

5. The method as defined in claim 4 further comprising spraying a release agent into a cavity in the mold prior to positioning the mold.

6. The method as defined in claim 1 further comprising applying a surface treatment to the surface prior to positioning the mold.

7. The method as defined in claim 1 wherein the step of injecting molding material is performed with a handheld hot melt gun inducing the plastic state in the thermoplastic elastomer.

8. The method as defined in claim 1 wherein the steps of applying the mold and sealing the mold are automated.

9. The method as defined in claim 1 wherein the fastener comprises an array of fasteners and the step of positioning the mold comprises positioning the mold over the array of fasteners.

10. The method as defined in claim 6 where in the step of applying a surface treatment comprises applying a primer over the surface within the sealing circumference.

11. The method as defined in claim 6 where in the step of applying a surface treatment comprises applying an adhesive over the surface within the sealing circumference.

* * * * *